(12) United States Patent
McAdam et al.

(10) Patent No.: US 7,339,989 B1
(45) Date of Patent: Mar. 4, 2008

(54) IN-PHASE AND QUADRATURE DECISION FEEDBACK EQUALIZER

(75) Inventors: Matthew W. McAdam, Vancouver (CA); John P. Plasterer, Burnaby (CA); Jurgen Hissen, Port Moody (CA)

(73) Assignee: PMC-Sierra, Inc., Santa Clara, CA (US)

( * ) Notice: Subject to any disclaimer, the term of this patent is extended or adjusted under 35 U.S.C. 154(b) by 698 days.

(21) Appl. No.: 10/818,189

(22) Filed: Apr. 5, 2004

Related U.S. Application Data

(60) Provisional application No. 60/461,067, filed on Apr. 7, 2003.

(51) Int. Cl.
*H03K 5/159* (2006.01)
(52) U.S. Cl. .................................... 375/232
(58) Field of Classification Search ............... 375/232, 375/229, 230, 231, 350; 333/18, 28 R; 708/300, 708/322, 323
See application file for complete search history.

(56) References Cited

U.S. PATENT DOCUMENTS

| | | | | |
|---|---|---|---|---|
| 5,617,450 | A * | 4/1997 | Kakuishi et al. | 375/230 |
| 6,055,269 | A | 4/2000 | Drost et al. | 375/232 |
| 6,418,164 | B1 * | 7/2002 | Endres et al. | 375/232 |
| 7,136,440 | B2 * | 11/2006 | Brianti et al. | 375/355 |
| 7,254,198 | B1 * | 8/2007 | Manickam et al. | 375/348 |
| 2003/0063680 | A1 * | 4/2003 | Nedic et al. | 375/260 |
| 2004/0001540 | A1 * | 1/2004 | Jones | 375/231 |

OTHER PUBLICATIONS

M.E. Austin, "Decision Feedback Equalization for Digital Communication over Dispersive Channels," M.I.T./R.L.E. Tech. Rep. 461, Aug. 11, 1967.
D.A. George, et al., "An Adaptive Decision Feedback Equalizer," IEEE Transactions on Communication Technology, vol. Com-19, No. 3, Jun. 1971.
G. Ungerboeck, "Fractional Tap-Spacing Equalizer and Consequences for Clock Recovery in Data Modems," IEEE Transactions on Communications, vol. 24, Issue 8, pp. 856-864, Aug. 1976.

* cited by examiner

*Primary Examiner*—Sam K. Ahn
(74) *Attorney, Agent, or Firm*—Knobbe Martens Olson & Bear LLP

(57) ABSTRACT

An apparatus and method are provided for equalizing a dispersive channel based on in-phase and quadrature samples corresponding to an input signal. An equalizer according to the present invention uses a novel adaptation algorithm to adjust filtering characteristics based on previous in-phase samples and a current quadrature sample. The adaptation algorithm is configured to update filter coefficients in response to detecting a transition in the in-phase samples. The equalizer provides equalization for quadrature post-cursor intersymbol interference (ISI) components of the input signal. In an embodiment, the equalizer also provides equalization for in-phase post-cursor ISI components, quadrature precursor ISI components, in-phase precursor ISI components, or a combination of the forgoing.

27 Claims, 10 Drawing Sheets

IN-PHASE AND QUADRATURE DECISION FEEDBACK EQUALIZER

RELATED APPLICATIONS

This application claims the benefit of U.S. Provisional Application No. 60/461,067, filed on Apr. 7, 2003, which is hereby incorporated by reference.

BACKGROUND OF THE INVENTION

1. Field of the Invention

The present invention relates to adaptive equalization methods and apparatus. More specifically, the present invention relates to methods and apparatus for equalizing a dispersive channel.

2. Description of the Related Art

Filtering is a common and powerful function that finds use in a variety of applications. One application is in communication systems in which information is sent from one place to another. When an applied filter is used to compensate for the effects of the channel across which the information is sent, the filter is typically referred to as an equalizer.

A major source of error in information transmission is intersymbol interference (ISI) that arises when a signal is sent across a dispersive channel. Dispersive channels tend to spread the energy of a transmitted signal out over time, which means both past and future symbols can interfere with the current symbol.

To further illustrate this point, consider a transmitted signal x[k] which is sent across a dispersive channel with an impulse response h[k]. The received signal, y[k], is given by:

$$y[k] = \sum_n h[n]x[k-n] \quad (1)$$
$$= h[0]x[k] + \sum_{n<0} h[n]x[k-n] + \sum_{n>0} h[n]x[k-n].$$

The second term in equation (1) arises from the precursor component of the channel impulse response and allows future symbols to interfere with the current symbol. The third term in equation (1) arises from the post-cursor component of the channel impulse response and allows previous symbols to interfere with the current symbol. Fortunately, equalization can be used to reduce or remove these components.

Adaptive Transversal Filters

Oftentimes, one has little or no prior knowledge of the channel characteristics, making it difficult to define an appropriate filter. To overcome this problem, filters are often made adaptive, allowing them to "learn" the channel characteristics. One type of filter used in adaptive equalization applications is the adaptive transversal filter. Adaptive transversal filters are well understood, non-recursive structures that operate in the discrete time-domain and have a finite impulse response (FIR).

FIG. 1 is a block diagram of a conventional adaptive transversal filter 100 including a tapped delay line 102 coupled to N+1 number of multipliers 103. The tapped delay line 102 comprises N delay blocks 104 each configured to delay an input signal x[k] by one sample delay time $Z^{-1}$. The input signal x[k] and the sample-time delayed signals x[k−1], x[k−2], ..., x[k−N] are multiplied by respective weights or filter coefficients $W_0, W_1, W_2, \ldots, W_N$ and summed to produce a filter output signal y[k]. For convenience, the input signal x[k] and the sample time delayed signals x[k−1], x[k−2], ... x[k−N] as well as the filter coefficients $W_0, W_1, W_2, \ldots, W_N$ are expressed respectively as vectors:

$$X_k = [x[k]\ x[k-1] \ldots x[k-N]]^T \quad (2),$$

and $$W_k = [W_0[k]\ W_1[k] \ldots W_N[k]]^T \quad (3),$$

where T denotes vector transpose.

The filter output signal y[k] is provided to an adaptation engine 106 configured to automatically adjust the filter coefficients $W_0, W_1, W_2, \ldots, W_N$ based on a desired response d[k] as compared to the filter output signal y[k]. Typically, the desired response d[k] is stored in a receiver and includes a copy of a known sequence transmitted to the receiver during a training mode.

The adaptation engine 106 includes an adaptation algorithm configured to update the filter coefficients $W_0, W_1, W_2, \ldots, W_N$ with time. Commonly used adaptation algorithms attempt to reduce the mean square error $E[\epsilon_k^2]$, where the error signal $\epsilon_k$ is given by:

$$\epsilon_k = d[k] - y[k] = d[k] - W_k^T X_k \quad (4).$$

Expanding the square of the error signal gives:

$$\varepsilon_k^2 = (d[k] - W_k^T X_k)^2 \quad (5)$$
$$= d[k]^2 + W_k^T X_k X_k^T W_k - 2d[k] X_k^T W_k.$$

To produce a reasonably simplified expression for the mean-square error, several assumptions may be made:

$W_k$ is fixed; and $X_k$, d[k], and $\epsilon_k$ are statistically wide-sense stationary.

With these assumptions, the mean-square error reduces to:

$$E[\varepsilon_k^2] = E[d[k]^2] + W^T E[X_k X_k^T]W - 2E[d[k]X_k^T]W. \quad (6)$$

From equation (6), it is clear that the mean-square error $E[\epsilon_k^2]$ is a quadrative function of the coefficient vector W. This quadratic function is referred to as the "error surface" and contains a global minimum at an optimal coefficient vector W. The task of the adaptation engine 106 is to walk the filter coefficients $W_0, W_1, W_2, \ldots, W_N$ down the error surface to a point close to the optimal solution.

There are a variety of basic algorithms available to converge the coefficient vector $W_k$ towards the optimal solution, including Newton's method, the steepest descent method, least-mean square (LMS) method, and recursive least squares (RLS) method. LMS is a commonly used algorithm due to its ease of computation. LMS achieves its simplicity by approximating the mean-square error $E[\epsilon_k^2]$ with $\epsilon_k^2$, leading to the following coefficient update equation:

$$W_{k+1} = W_k + \mu \epsilon_k X_k \quad (7),$$

where μ is a step-size scalar that can be used to control convergence rate and steady-state accuracy.

Local Minima on the Error Surface

Under certain circumstances, local minima can also exist on the error surface. Adaptation engine that become trapped on a local minimum provide a non-optimal coefficient vector W, which reduces the effectiveness of the transversal filter. Local minima are typically caused by non-linear effects in the signal path, certain channel characteristics, or combinations thereof.

Blind Equalization

When the desired response d[k] is unknown, adaptation is typically done in blind mode. There are many algorithms capable of blindly converging an adaptive filter. Typically, algorithms suitable for blind equalization use higher-order statistics of the filter's input. Example algorithms include Sato's algorithm and the Constant Modulus Algorithm (CMA).

Decision Feedback Equalizers

The Decision Feedback Equalizer (DFE) is an alternative to the feedforward transversal filter. Adaptive DFEs typically use adaptive transversal filters, such as the adaptive transversal filter 100 shown in FIG. 1, in a feedback role. DFEs can also use adaptive transversal filters in a feedforward role. In a typical symbol-rate DFE, precursor and post-cursor components spaced at integer multiples of the symbol period $T_S$ are corrected for. For example, a DFE with N feedback taps can correct for post-cursor components that occur at spacings of $T_S$, $2T_S$, ..., $NT_S$ from the current symbol. DFEs can be implemented in analog or digital form. Digital implementations typically use analog-to-digital conversion of the filter's input signal.

FIG. 2 is a block diagram of a conventional adaptive DFE 200 having a feedforward section 202, a feedback section 204 and a decision device 206. The feedforward section 202 includes a first transversal filter 208 and a first adaptation engine 210 configured to receive a feedforward training signal $d_{ff}[k]$. The role of the feedforward section 202 is to reduce the precursor component of the ISI. The feedback section 204 includes a second transversal filter 212 and a second adaptation engine 214 configured to receive a feedback training signal $d_{fb}[k]$. The role of the feedback section 204 is to reduce the post-cursor component of the ISI.

FIG. 3 is a block diagram of a conventional decision-directed DFE 300 including a feedforward transversal filter 302, a decision device 304, a feedback transversal filter 306 and an adaptation engine 308. The decision-directed DFE 300 operates in a "decision-directed" mode in which the Output signal 310 of the decision device 304 is used to create the desired response provided to the adaptation engine 308. Specifically, an error signal $\epsilon_k$ comprising the difference between the input 314 of the decision device 304 and the Output signal 310 is provided to the adaptation engine 308 as the desired response. Thus, the decision-directed DFE 300 does not require a training signal to converge the adaptation engine 308. However, convergence is more difficult.

The decision-directed DFE 300 shown in FIG. 3 uses a common error signal $\epsilon_k$ and adaptation engine 308 to adapt both the feedforward transversal filter 302 and feedback transversal filter 306. The generation of the error signal $\epsilon_k$ can be challenging and uses additional conditioning circuitry 314 to process the soft decisions (i.e., the input 314 of the decision device 304) before subtracting them from the hard decisions (i.e., the Output signal 310). The conditioning circuit 314 can include, for example, sample-and-hold circuitry, automatic gain control circuitry, combinations of the foregoing, or the like. The conditioning circuitry 314 accounts for the delay through the decision device 304 and also prevents the hard decisions from swamping the small signal level of the soft decisions.

Fractionally Spaced Equalizers

Fractionally Spaced Equalizers (FSEs) are transversal equalizers that include taps spaced at some fraction of the symbol period $T_S$. FSEs are used, for example, as a linear equalizer or the feedforward portion of a DFE. A typical choice for tap spacing is $T_S/2$, which allows correction of both the in-phase components and the quadrature components in the channel impulse response.

For an ideal, jitter-free sampling clock, equalization of anything but the ideal in-phase samples provides no improvement in performance. However, when a realistic, jittered clock is considered, the true sampling instant slides around the ideal point. Thus, FSEs that provide equalization across the symbol period provide improved performance to symbol-rate equalizers.

SUMMARY OF THE INVENTION

The present invention relates to an apparatus and method for equalizing a dispersive channel based on in-phase and quadrature samples corresponding to an input signal. An equalizer according to a preferred embodiment of the present invention uses a novel adaptation algorithm to adjust filtering characteristics based on previous in-phase samples and a current quadrature sample. The adaptation algorithm is configured to update filter coefficients in response to detecting a transition in the in-phase samples. In one embodiment, the equalizer provides equalization for quadrature post-cursor intersymbol interference (ISI) components of the input signal. The equalizer may also provide equalization for in-phase post-cursor ISI components, quadrature precursor ISI components, in-phase precursor ISI components, or a combination of the foregoing.

According to the foregoing, the invention includes an equalizer configured to compensate for the effects of a communication channel on received data using a quadrature error signal. The equalizer includes a filter that receives in-phase samples corresponding to a data signal, an adaptation engine that receives a quadrature sample corresponding to the data signal, and a summing device that receives the data signal. The filter is configured to generate a filtered signal of the in-phase samples according to a set of filter parameters. The adaptation engine is configured to update the set of filter parameters based on the quadrature sample and the in-phase samples. The summing device is configured to subtract the filtered signal from the data signal.

The invention also comprises a method for equalizing a communication channel. The method includes generating hard decision data comprising a first in-phase sample and an in-phase sample history of soft decision data. The soft decision data corresponds to a filtered version of the received data signal. The in-phase sample history comprises at least a second in-phase sample. The method also includes generating a quadrature sample of the soft decision data and filtering the hard decision data based at least in part on the in-phase sample history and the quadrature sample. The method further includes subtracting the filtered hard decision data from the received data signal.

The invention also includes an apparatus for equalizing a communication channel. The apparatus includes a means for sampling an equalized signal in response to a first signal and a second signal, wherein the second signal is out-of-phase with the first signal. The apparatus also includes a means for adaptively filtering first samples taken in response to the first signal based on a second sample taken in response to the second signal and a portion of the first samples. The apparatus further includes a means for removing the filtered first samples from an input signal.

The invention further comprises a method for compensating for intersymbol interference (ISI). The method includes receiving a data signal and generating soft decisions by subtracting quadrature post-cursor ISI components from the received data signal. The method also includes generating in-phase samples and a quadrature sample of the soft decisions. The method further includes adaptively filtering the in-phase samples using the quadrature sample to determine the quadrature post-cursor ISI components.

Other features and advantages of the present invention will become apparent to those of ordinary skill in the art through consideration of the ensuing description, the accompanying drawings, and the appended claims.

Neither this summary nor the following detailed description purports to define the invention. The invention is defined by the claims.

BRIEF DESCRIPTION OF THE DRAWINGS

A system and method which embodies the various features of the invention will now be described with reference to the following drawings.

DETAILED DESCRIPTION OF THE PREFERRED EMBODIMENT

The present invention comprises an in-phase and quadrature decision feedback equalizer (IQ-DFE) configured to equalize a dispersive channel based on offset samples of a filter's input. An IQ-DFE according to the present invention may be used, for example, in telecommunication systems, biomedical systems, industrial control systems, storage media systems, or the like.

Figure 1:
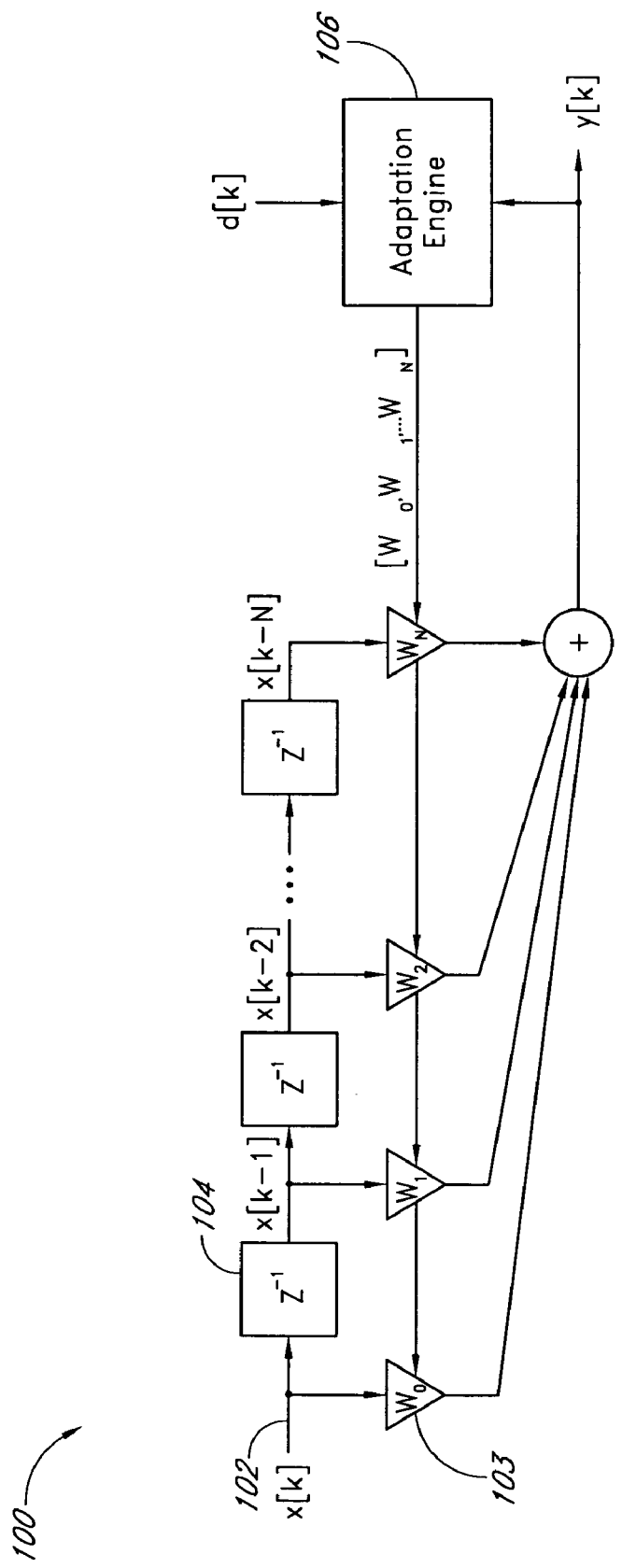
FIG. 1 is a block diagram of a conventional adaptive transversal filter.
Figure 2:
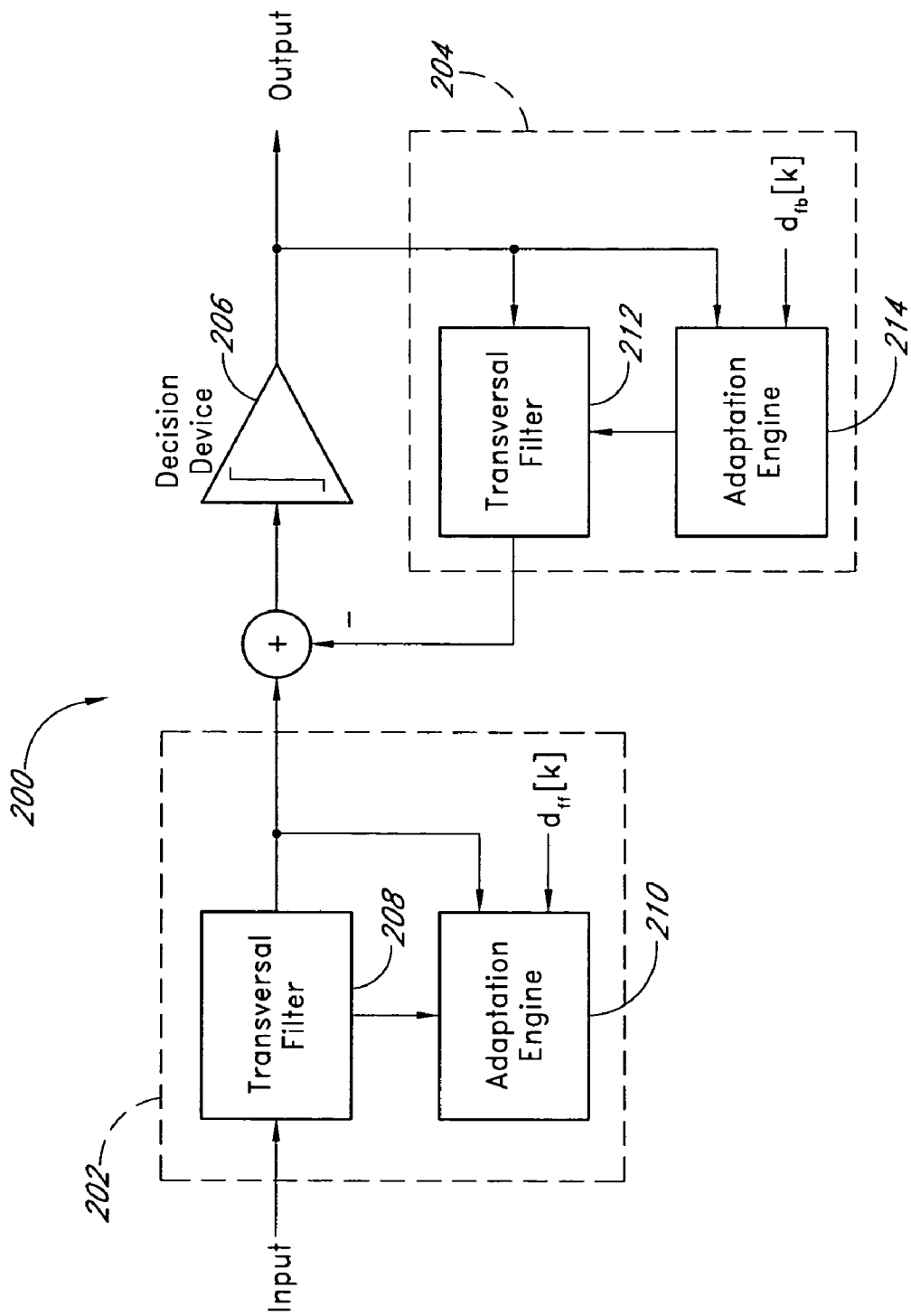
FIG. 2 is a block diagram of a conventional adaptive DFE.
Figure 3:
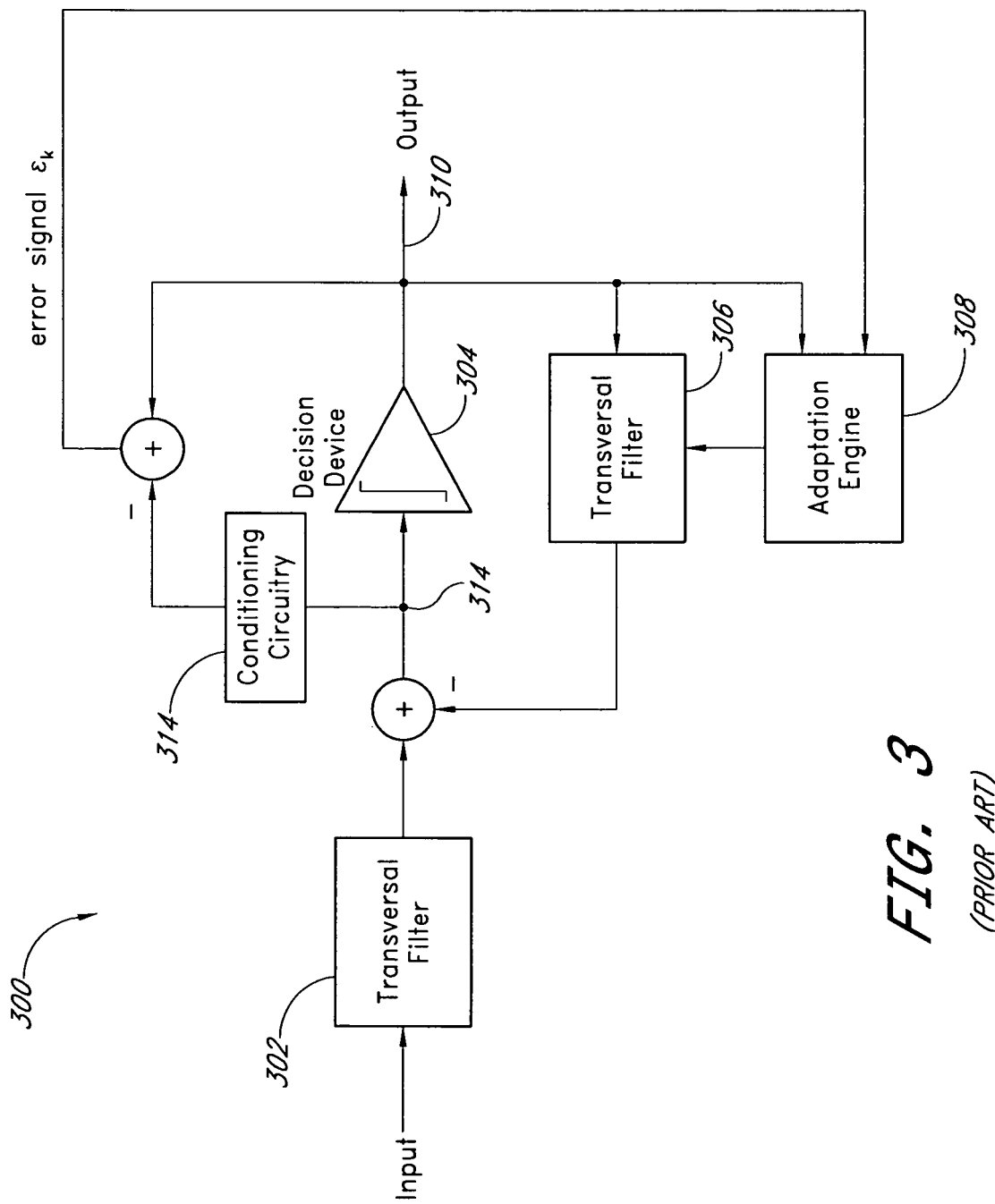
FIG. 3 is a block diagram of a conventional decision-directed DFE.

As discussed above, a conventional DFE performs equalization based on in-phase, or center, samples of the filter input. Typically, the in-phase samples correspond to an in-phase clock recovered from a received signal. In the above discussion of FIG. 1, the conventional adaptive transversal filter 100 and associated algorithms operate on real-valued data. The extension to complex-valued data and coefficients is known in the art and is included in the scope of the present disclosure.

The coefficient vector W is chosen so as to reduce or minimize the mean square error $E[\epsilon_k^2]$ between the filter output signal y[k] and the desired response d[k]. Those skilled in the art will recognize that it can be advantageous to choose the coefficient vector W based on some criterion other than the mean-square error $E[\epsilon_k^2]$. This results in forms of the coefficient updating equation that can differ significantly from equation (7). Such techniques are known and used by artisans skilled in the art and are included within the scope of the present invention.

In an embodiment of the invention, equalization is performed based on quadrature, or transition, samples corresponding to the filter input. Equalization can be performed, for example, by adapting a filter based on both in-phase samples and quadrature samples according to a novel adaptation algorithm. The filter is adapted when a transition is detected in the in-phase samples.

The quadrature samples may correspond, for example, to a quadrature clock recovered from a received signal. Thus, in an embodiment of the present invention, an IQ-DFE comprises circuitry shared with other components of a communication system. For example, the IQ-DFE may share circuitry with timing recovery circuitry, such as BAUD-rate timing recovery circuitry, or the like.

Equalization based on quadrature samples reduces the impact of clipping a channel output signal before equalizing. Thus, in an embodiment of the invention, non-linear gain is inserted between a channel output and an IQ-DFE. Equalization based on quadrature samples also reduces the complexity of generating an error signal, as compared to a conventional DFE. In an embodiment of the invention, an error signal is generated by a sampler operated with a quadrature clock.

Although the disclosure herein refers to quadrature samples offset from in-phase samples by substantially half a symbol period, the present invention is not so limited and includes equalization based on samples that are offset from in-phase samples by other fractions of the symbol period. For example, and not by limitation, an IQ-DFE can perform equalization based on samples offset from in-phase samples by a quarter of a symbol period.

According to one aspect of the invention, an IQ-DFE is configured to reduce post-cursor ISI jitter of a received data signal. For example, the IQ-DFE may be configured to reduce both quadrature post-cursor ISI components and in-phase post-cursor ISI components of a received data signal. In one aspect of the invention, an IQ-DFE is configured to reduce both post-cursor ISI and precursor ISI components of a received data signal.

In an embodiment of the invention, an integrated circuit comprises an IQ-DFE core configured to perform equalization, and an adaptation engine configured to adapt the equalization based on quadrature samples. Alternatively, the adaptation engine comprises a separate integrated circuit. The adaptation engine may comprise a processor that executes a software program for adapting the equalization based on the quadrature samples. In an embodiment, a processor comprises an adaptation engine and an IQ-DFE core configured to receive an input signal from an analog-to-digital converter.

In the following description, reference is made to the accompanying drawings, which form a part hereof, and which show, by way of illustration, specific embodiments or processes in which the invention may be practiced. Where possible, the same reference numbers are used throughout the drawings to refer to the same or like components. In some instances, numerous specific details are set forth in order to provide a thorough understanding of the present invention. The present invention, however, may be practiced without the specific details or with certain alternative equivalent components and methods to those described herein. In other instances, well-known components and methods have not been described in detail so as not to unnecessarily obscure aspects of the present invention.

Quadrature Post-cursor Correction

Figure 4:
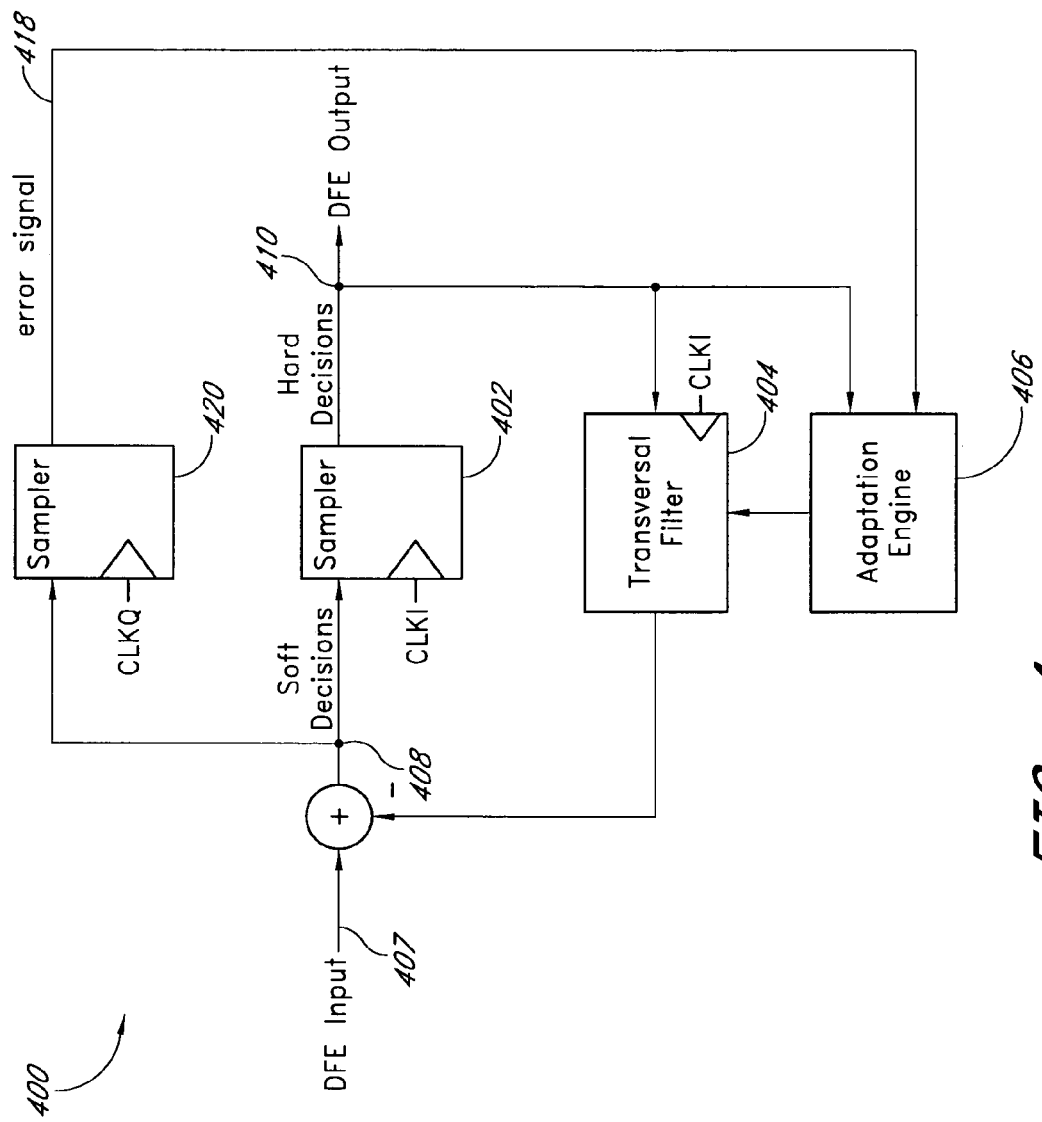
FIG. 4 is a block diagram illustrating an in-phase and quadrature DFE (IQ-DFE) according to an embodiment of the invention.

FIG. 4 is a block diagram illustrating an IQ-DFE 400 according to an embodiment of the invention. The IQ-DFE 400 includes a first sampler 402, a transversal filter 404 and an adaptation engine 406 configured to reduce the post-cursor ISI components of a DFE Input signal 407. The first sampler 402 generates in-phase samples from the soft decisions 408. The in-phase samples are configured to recover the data of the DFE Input signal 407 and are provided as the output of the IQ-DFE 400 as hard decisions 410. The first sampler 402 is clocked with an in-phase clock CLKI.

The in-phase clock CLKI is also used to clock the transversal filter 404. The transversal filter 404 is configured to receive the hard decisions 410 from the first sampler 402 and to generate a representation of the post-cursor ISI components that are then subtracted from the DFE Input signal 407 using a summing device to create the soft decisions 408. Thus, previously generated hard decisions 410 are used to subtract the ISI of previous symbols from a current symbol of the DFE Input signal 407.

The adaptation engine 406 is configured to adapt the output of the transversal filter 404 to account for unknown channel characteristics or channel characteristics that change with time. The adaptation engine 406 uses an adaptation algorithm to adjust the characteristics of the transversal filter 404 based on an error signal 418 and the hard decisions 410 provided by the first sampler 402.

The IQ-DFE 400 also includes a second sampler 420 configured to generate the error signal 418 provided to the adaptation engine 406. The second sampler 420 is configured to generate quadrature samples of the soft decisions 408. The quadrature samples are preferably offset from the in-phase samples by $T_S/2$, where $T_S$ represents the symbol period of the received data. Thus, for example, the in-phase samples may be taken at approximate centers of corresponding symbols and the quadrature samples may be taken at approximate edges of corresponding samples. Alternatively, the second sampler 420 may be configured to sample the soft decisions 408 at a fraction of the symbol period other than $T_S/2$. For example, and not by limitation, the second sampler 420 may be configured to generate samples offset from the in-phase samples by $T_S/4$. In an embodiment, the second sampler 420 is clocked with a quadrature clock CLKQ that is out-of-phase with the in-phase clock CLKI.

By providing the error signal 418 to the adaptation engine 406, equalization is performed at quadrature offsets from a current in-phase sample. In an embodiment, the transversal filter 404 includes N feedback taps (not shown) and corrects for post-cursor ISI components that occur at spacings of $3T_S/2, 5T_S/2, \ldots, (2N+1)T_S/2$ from a current in-phase sample. Increasing the number of feedback taps reduces the components of the post-cursor ISI at more quadrature sampling offsets. Thus, jitter of a received signal is reduced, which in turn improves bit error rates (BERs) and aids clock-recovery circuits.

In an embodiment, the DFE Input signal 407 is unsampled. Alternatively, the DFE Input signal 407 is sampled at a multiple of its Nyquist rate so that both the in-phase components and quadrature components are available at the decision points (i.e., at the inputs of the first sampler 402 and the second sampler 420). Since the quadrature clock CLKQ controls the second sampler 420, the error signal 418 is defined by zero-crossing samples. Using zero-crossing samples increases the IQ-DFE's 400 immunity to non-linear gain in the signal path. Thus, the performance and stability of the adaptation algorithm is improved. Also, a designer can purposefully introduce non-linear gain before the IQ-DFE equalizer 400.

The adaptation engine 406 comprises, by way of example, one or more processors, ASICs, hardware, or other substrate configurations capable of representing data and instructions which operate as described herein or similar thereto. The adaptation engine 406 may also comprise program logic or software capable of representing data instructions which operate as described herein or similar thereto. The adaptation engine 406 may also comprise controller circuitry, processor circuitry, general purpose single-chip or multiple-chip microprocessors, digital signal processors, embedded microprocessors, microcontrollers, combinations of the foregoing, or the like.

Quadrature Post-cursor Adaptation Algorithm

The adaptation engine 406 implements an adaptation algorithm to process the IQ-DFE's 400 error signal 418. As discussed above, a coefficient update equation may be given by equation (7) for an error signal $\epsilon_k$ produced by the difference between an output and an input of a decision device. In an embodiment of the invention, an update equation configured to process the quadrature sampled error signal 418 is given by:

$$W_{k+1} = W_k + \mu * EN * Q * I_{k-1} \qquad (9),$$

where $\mu$ is a step-size scalar used to control convergence rate and steady-state accuracy, Q is the current quadrature sample (i.e., the current value of the error signal 418), EN is a transition-detect enable signal given by $$EN = \begin{cases} 1 & I[k] \neq I[k-1] \\ 0 & I[k] = I[k-1], \end{cases} \qquad (10)$$

and $I_{k-1}$ is the in-phase sample history given by $$I_{k-1} = [I[k-1]\ I[k-2]\ \ldots\ I[k-N]]^T \qquad (11).$$

The transition detect enable signal EN allows the coefficients to update from the coefficient vector $W_k$ to the updated coefficient vector $W_{k+1}$ when a transition is detected. The in-phase sample history $I_{k-1}$ does not include the current or most recent sample I[k] because this would equalize the first post-cursor quadrature point, which is actually part of the cursor symbol. In an embodiment, the adaptation engine 406 retimes the current quadrature sample Q on the in-phase clock CLKI so that the signals lie in the same clock domain.

Equation (9) comprises a novel modification of the LMS coefficient update algorithm given by equation (7). From equation (9), an artisan will recognize that other conventional adaptation algorithms (e.g., RLS) can be modified to accommodate the quadrature sampled error signal 418.

In-phase and Quadrature Post-cursor Correction

Figure 5:
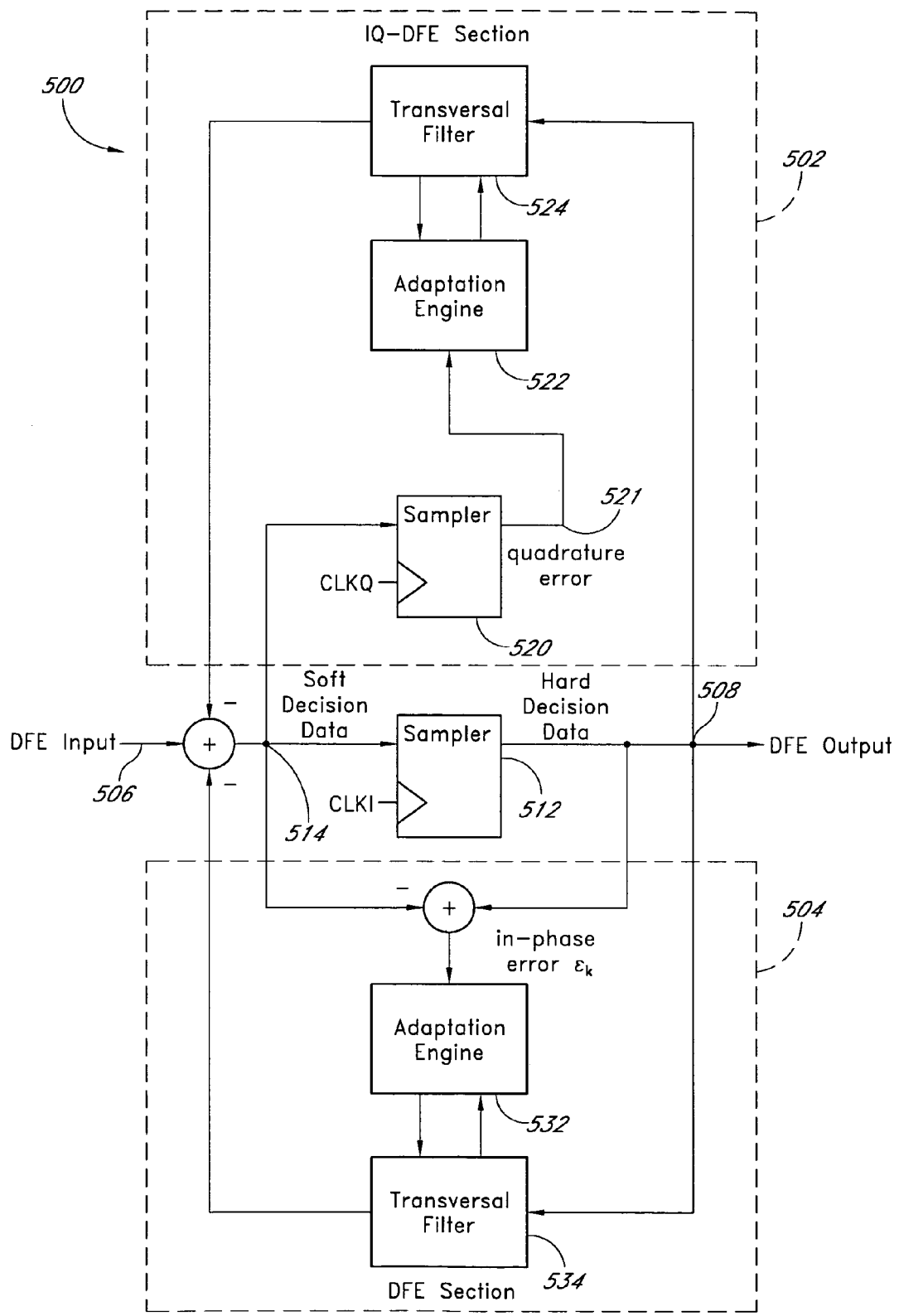
FIG. 5 is a block diagram illustrating an equalizer comprising an IQ-DFE coupled in parallel to a DFE according to an embodiment of the invention.

FIG. 5 is a block diagram illustrating an equalizer 500 comprising an IQ-DFE section 502 coupled in parallel to a DFE section 504 according to an embodiment of the invention. The equalizer 500 is configured to receive a DFE Input signal 506 and to provide a filtered DFE Output signal 508 that includes correction for both in-phase and quadrature post-cursor ISI components. The equalizer 500 includes a first sampler 512 configured to generate in-phase samples of soft decision data 514 using an in-phase clock CLKI. The in-phase samples are provided by the first sampler 512 as hard decision data at the DFE Output signal 508.

The IQ-DFE section 502 includes a second sampler 520, a first adaptation engine 522 and a first transversal filter 524. The second sampler 520 is configured to generate quadrature samples of the soft decision data 514 that are offset from the in-phase samples by approximately $T_s/2$. The second sampler 520 is configured to sample based on a quadrature clock CLKQ that is out-of-phase with the in-phase clock CLKI. In an embodiment, the quadrature clock CLKQ is 90 degrees out-of-phase with the in-phase clock CLKI. The quadrature samples are provided by the second sampler 520 as a quadrature sampled error signal 521 to the first adaptation engine 522. The first adaptation engine 522 is configured to adapt the output of the first transversal filter 524 to account for quadrature post-cursor ISI components. The first adaptation engine 522 includes an adaptation algorithm configured to process the quadrature sampled error signal 521 using an update equation, such as equation (9).

The first transversal filter 524 is configured to receive the DFE Output signal 508 from the first sampler 512 and to generate a representation of the quadrature post-cursor ISI components that are then subtracted from the DFE Input signal 506 using a summing device when creating the soft decision data 514.

The DFE section 504 includes a second adaptation engine 532 and a second transversal filter 534. The second adaptation engine 532 is configured to adapt the output of the second transversal filter 534 to account for in-phase post-cursor ISI components. The second adaptation engine is configured to receive an in-phase error signal $\epsilon_k$ comprising the difference between the hard decision data at the DFE Output signal 508 and the soft decision data 514. The second adaptation engine 532 includes an adaptation algorithm configured to process the in-phase error signal $\epsilon_k$ using an update equation, such as equation (7).

The second transversal filter 534 is configured to receive the DFE Output signal 508 from the first sampler 512 and to generate a representation of the in-phase post-cursor ISI components that are then subtracted from the DFE Input signal 506 when creating the soft decision data 514.

Thus, the IQ-DFE section 502 is configured to correct for quadrature post-cursor ISI components and the DFE section 504 is configured to correct for in-phase post-cursor ISI components. The parallel combination of the IQ-DFE section 502 and the DFE section 504 improves BER performance beyond that achieved by either section 502, 504 operating alone.

Quadrature Precursor and Post-cursor Correction

Figure 6:
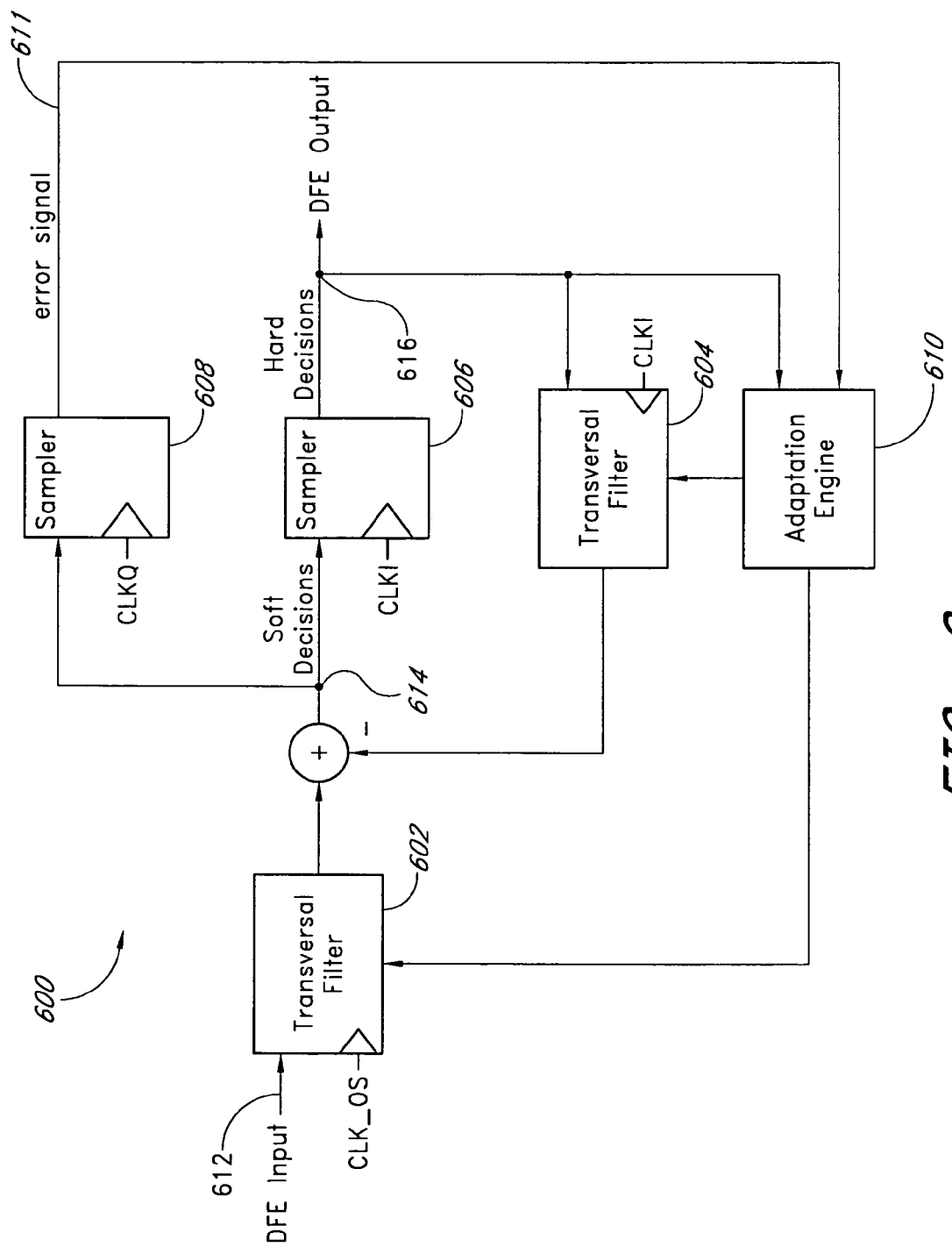
FIG. 6 is a block diagram of an IQ-DFE having feedforward and feedback sections according to an embodiment of the invention.

FIG. 6 is a block diagram of an IQ-DFE 600 having feedforward and feedback sections according to an embodiment of the invention. The IQ-DFE 600 includes a feedforward transversal filter 602, a feedback transversal filter 604, a first sampler 606, a second sampler 608 and an adaptation engine 610. The feedforward transversal filter 602 is configured to reduce precursor ISI components of a DFE input signal 612.

The feedforward transversal filter 602 operates with respect to an oversampling clock CLK_OS. In an embodiment, the oversampling clock CLK_OS has a frequency that is a positive integer multiple of the Nyquist rate of the DFE input signal 612 so that in-phase and quadrature samples are available at the inputs of the first sampler 606 and the second sampler 608.

The first sampler 606 and the second sampler 608 are configured to select appropriate information from the discrete-time stream provided by the feedforward transversal filter 602. The first sampler 606 generates in-phase samples of soft decisions 614. The in-phase samples are provided as hard decisions 616 at the output of the IQ-DFE 600. In an embodiment, the first sampler 606 is clocked with an in-phase clock CLKI.

The in-phase clock CLKI is also used to clock the feedback transversal filter 604. The feedback transversal filter 604 is configured to receive the hard decisions 616 from the first sampler 606 and to generate a representation of the post-cursor ISI components that are subtracted from the DFE input signal 612 using a summing device when generating the soft decisions 614.

The adaptation engine 610 is configured to receive the hard decisions 616 from the first sampler 606 and an error signal 611 to account for unknown channel characteristics or channel characteristics that change with time. The adaptation engine 610 includes an adaptation algorithm configured to adjust the characteristics of both the feedforward transversal filter 602 and the feedback transversal filter 604 based on the difference between the hard decisions 616 and the error signal 611.

The second sampler 608 is configured to generate the error signal 611 by generating quadrature samples of the soft decisions 614 offset from the in-phase samples by $T_s/2$. In an embodiment, the second sampler 608n is clocked with a quadrature clock CLKQ.

Example Hardware and Software Implementations

Figure 7:
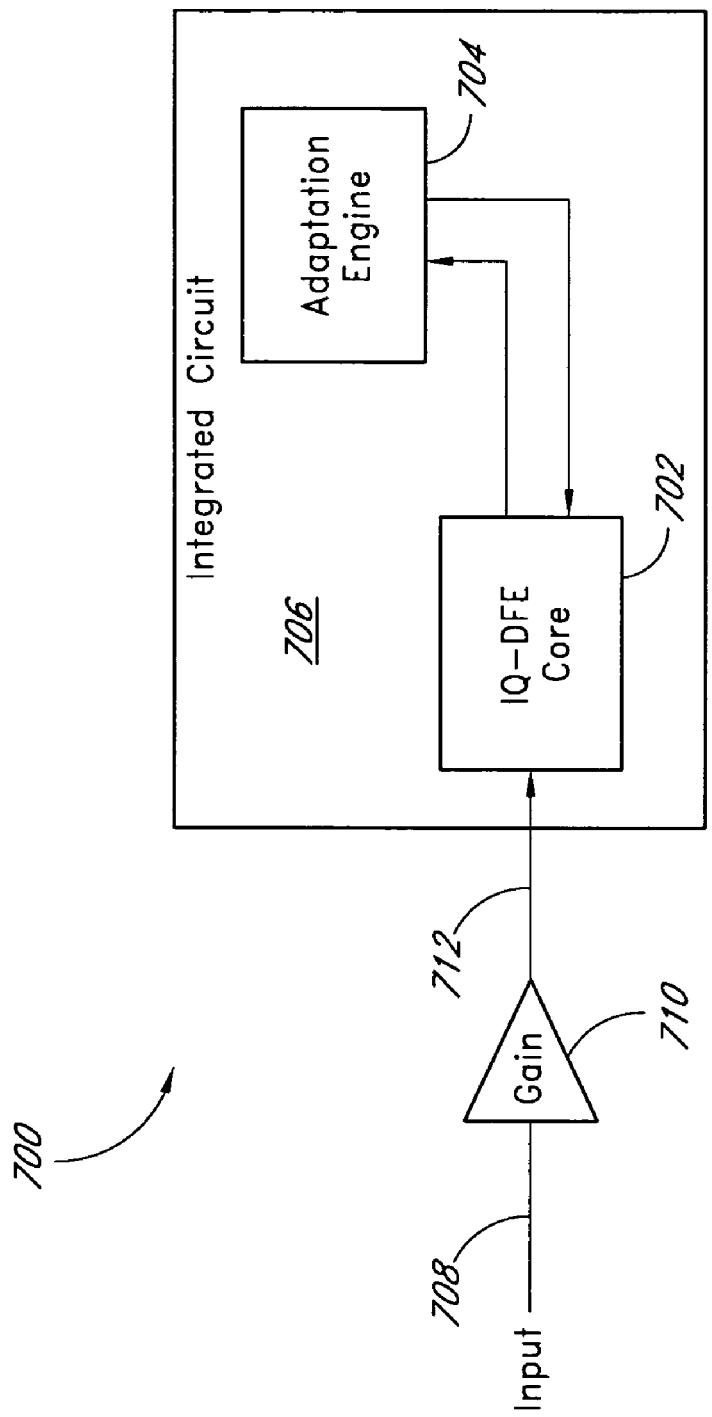
FIG. 7 illustrates a block diagram of an exemplary IQ-DFE according to an embodiment of the invention having an IQ-DFE core and an adaptation engine implemented on an integrated circuit.

FIG. 7 illustrates a block diagram of an exemplary IQ-DFE 700 according to an embodiment of the invention. The exemplary IQ-DFE 700 includes an IQ-DFE core 702 and an adaptation engine 704 implemented on an integrated circuit (IC) 706. The IC 706 may comprise, for example, a field programmable gate array (FPGA) or similar device, a custom IC board, other hardware configurations, a combination of the foregoing, or the like.

The IQ-DFE core 702 is configured to generate in-phase and quadrature samples corresponding to an input signal 708 and to provide to the adaptation engine 704 an error signal corresponding to at least the quadrature samples. In an embodiment, the error signal also includes an in-phase error corresponding to the in-phase samples. The adaptation engine 704 is configured to account for channel characteristics of the input signal 708 based on the error signal and the in-phase samples.

In an embodiment, the exemplary IQ-DFE 700 further includes a gain device 710 configured to receive the input signal 708 and to provide an amplified signal 712 to the IQ-DFE core 702. In an embodiment, the gain device 710 is configured to provide non-linear gain.

Figure 8:
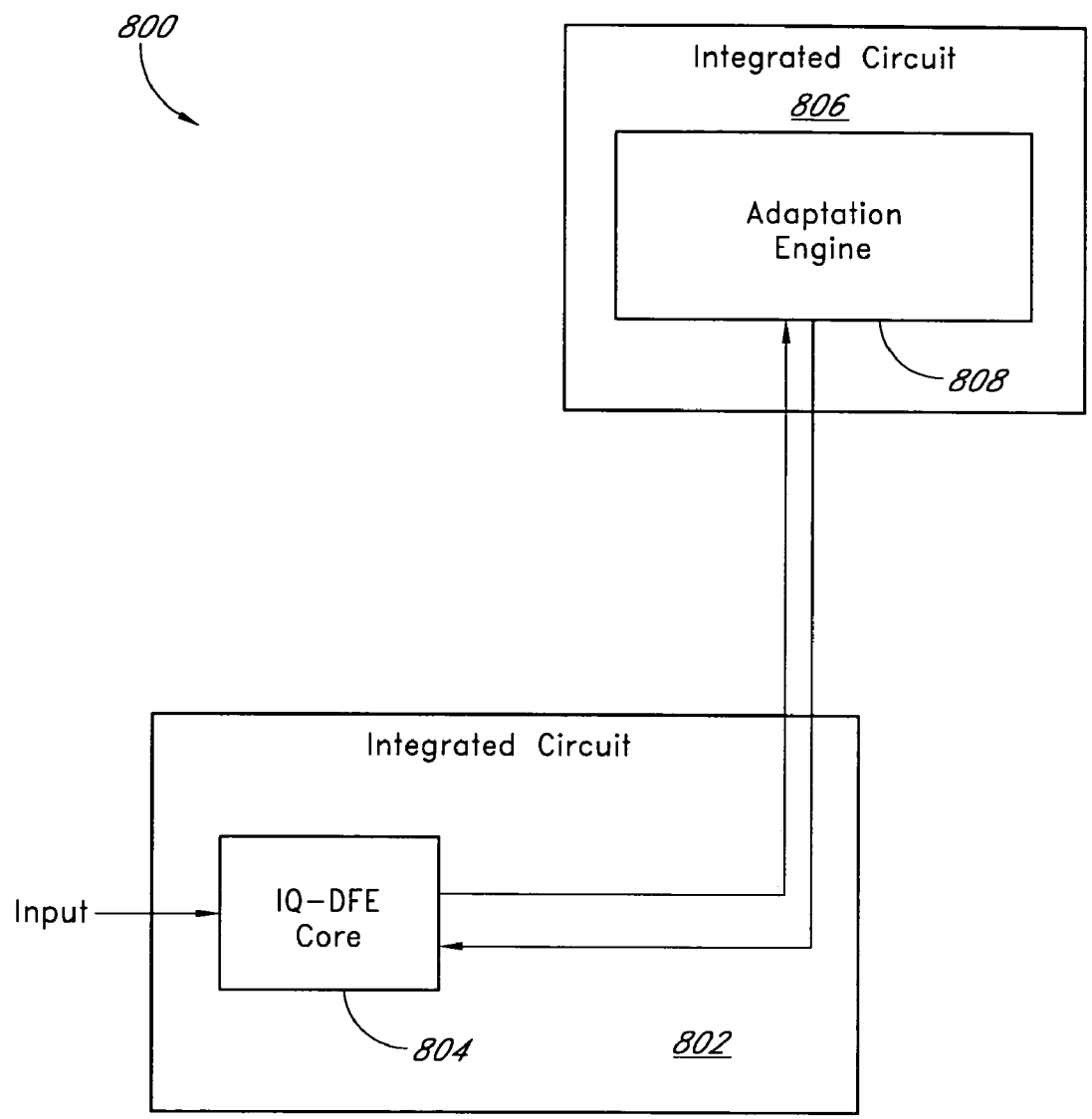
FIG. 8 illustrates a block diagram of an exemplary IQ-DFE according to an embodiment of the invention having a first integrated circuit including an IQ-DFE core and a second integrated circuit including an adaptation engine.

FIG. 8 illustrates a block diagram of an exemplary IQ-DFE 800 according to another embodiment of the invention. The exemplary IQ-DFE 800 comprises a first IC 802 including an IQ-DFE core 804, and a second IC 806 including an adaptation engine 808. The first IC 802 and the second IC 806 may each comprise, for example, an FPGA or similar device, a custom IC board, other hardware configurations, a combination of the foregoing, or the like. The IQ-DFE core 804 and the adaptation engine 808 are each configured to operate as described above with relation to FIGS. 4 through 7, or similar thereto.

Figure 9:
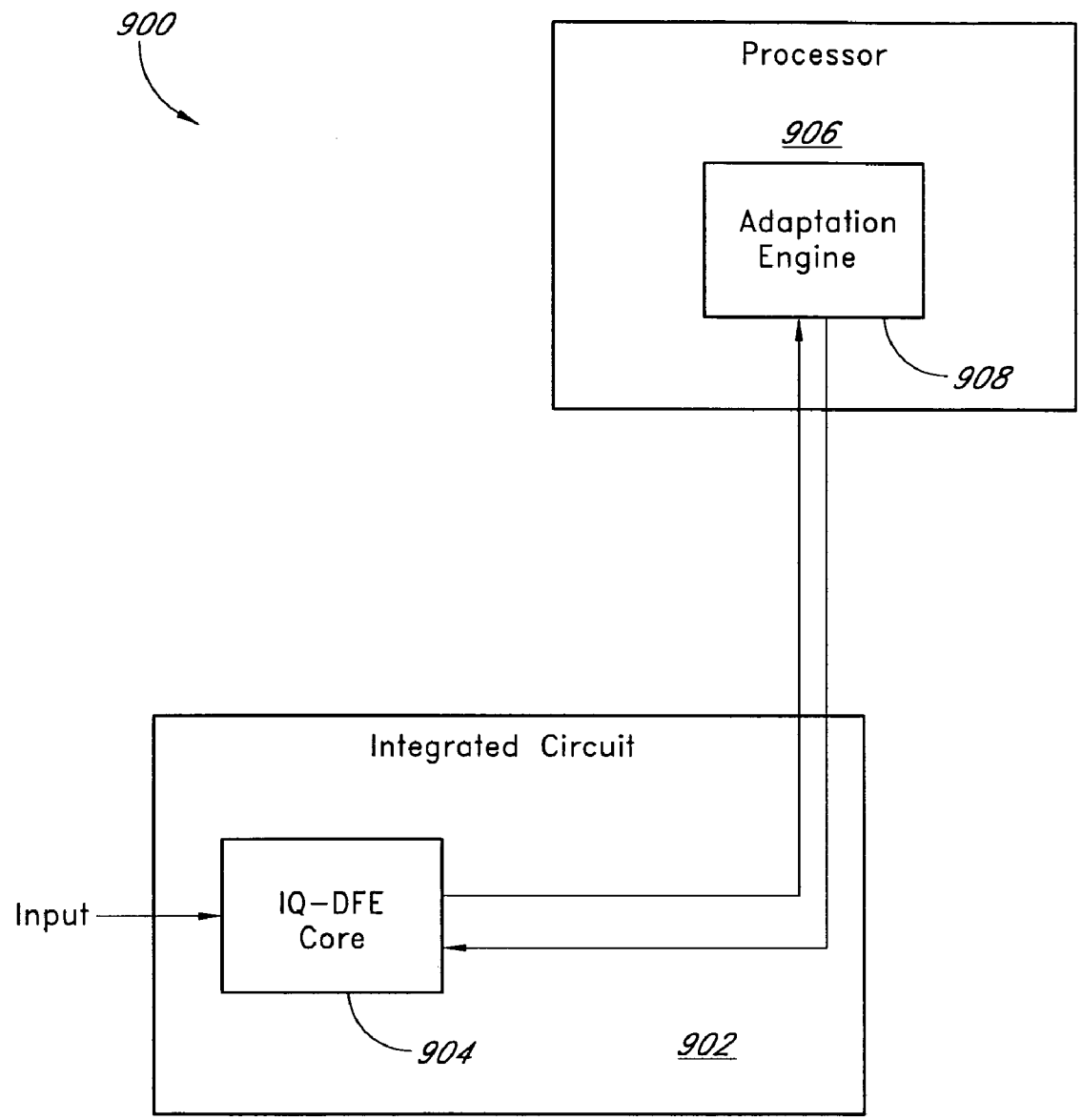
FIG. 9 illustrates a block diagram of an exemplary IQ-DFE according to an embodiment of the invention having an integrated circuit including an IQ-DFE core and a processor including an adaptation engine.

FIG. 9 illustrates a block diagram of an exemplary IQ-DFE 900 according to another embodiment of the invention. The exemplary IQ-DFE 900 comprises an IC 902 including an IQ-DFE core 904, and a processor 906 including an adaptation engine 908. The IC 902 comprises, for example, an FPGA or similar device, a custom IC board, other hardware configurations, a combination of the foregoing, or the like. The processor 906 comprises, for example, a digital signal processor (DSP), controller circuitry, processor circuitry, general purpose single-chip or multiple-chip microprocessors, embedded microprocessors, microcontrollers, combinations of the foregoing, or the like. The adaptation engine 908 comprises software instructions. The IQ-DFE core 904 and the adaptation engine 908 are each configured to operate as described above with relation to FIGS. 4 through 7, or similar thereto.

Figure 10:
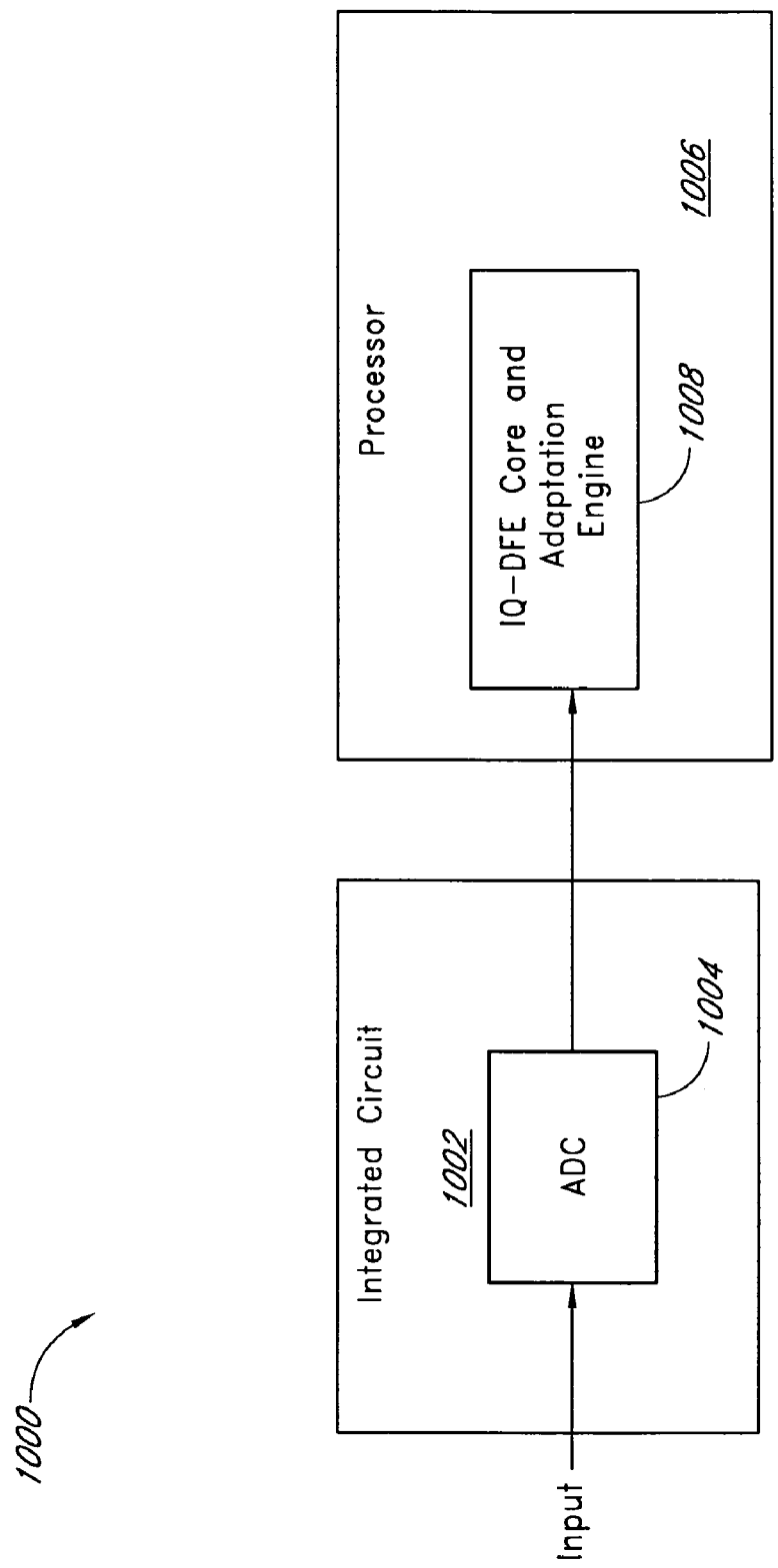
FIG. 10 illustrates a block diagram of an exemplary IQ-DFE according to an embodiment of the invention having an integrated circuit including an analog-to-digital converter and a processor including an IQ-DFE core and adaptation engine.

FIG. 10 illustrates a block diagram of an exemplary IQ-DFE 1000 according to another embodiment of the invention. The exemplary IQ-DFE 1000 comprises an IC 1002 including an analog-to-digital converter (ADC) 1004, and a processor 1006. The processor 1006 includes an IQ-DFE core and adaptation engine module 1008. The IQ-DFE core and adaptation engine module 1008 comprises software instructions configured to operate as described above with relation to FIGS. 4 through 7, or similar thereto.

One embodiment of an IQ-DFE provides equalization for non-return to zero (NRZ) signals, such as PAM-2 NRZ signals, as well as to multilevel PAM signals. One of ordinary skill in the art will appreciate that NRZ signals do not carry information in a quadrature phase. In one embodiment, the IQ-DFE needs only a transition to take place for coefficient updates to occur.

Although the present invention has been described with reference to specific embodiments, other embodiments will occur to those skilled in the art. For example, an IQ-DFE according to the present invention may include various combinations of the features and components of the foregoing embodiments. It is to be understood that the embodiments described above have been presented by way of example, and not limitation, and that the invention is defined by the appended claims.

What is claimed is:

1. An equalizer configured to compensate for the effects of a communication channel on received data, the equalizer comprising:
a first filter that receives in-phase hard decision samples corresponding to an equalized signal, the first filter configured to generate a first filtered signal of the in-phase hard decision samples according to a first set of filter parameters;
a first adaptation engine that receives a quadrature hard decision sample corresponding to the equalized signal, the first adaptation engine configured to update the first set of filter parameters based on the quadrature hard decision sample and the in-phase hard decision samples, wherein the first adaptation engine implements a filter coefficient update equation given substantially by $W_{k+1}=W_k+\mu*EN*Q*I_{k-1}$, wherein $W_{k+1}$ represents an updated filter coefficient vector, $W_k$ represents a filter coefficient vector, $\mu$ represents a step-size scalar, EN represents a transition-detect enable signal, Q represents the quadrature hard decision sample, and $I_{k-1}$ is a vector representing a portion of the in-phase samples; and
a summing device that receives a data signal and the first filtered signal, the summing device configured to subtract the first filtered signal from the data signal to generate the equalized signal.

2. An equalizer configured to compensate for the effects of a communication channel on received data, the equalizer comprising:
a first filter that receives in-phase hard decision samples corresponding to an equalized signal, the first filter configured to generate a first filtered signal of the in-phase hard decision samples according to a first set of filter parameters;
a first adaptation engine that receives a quadrature hard decision sample corresponding to the equalized signal, the first adaptation engine configured to update the first set of filter parameters based on the quadrature hard decision sample and the in-phase hard decision samples;
a summing device that receives a data signal and the first filtered signal, the summing device configured to subtract the first filtered signal from the data signal to generate the equalized signal; and
a first sampler that receives an output of the summing device and an in-phase clock, the output of the summing device corresponding to the equalized signal, the first sampler configured to generate the in-phase hard decision samples.

3. The equalizer of claim 2, further comprising a second sampler that receives the output of the summing device and a quadrature clock, the output of the summing device corresponding to the equalized signal, the second sampler configured to generate the quadrature hard decision samples.

4. The equalizer of claim 3, wherein the received data is encoded in a non-return to zero (NRZ) format such that the received data signal does not carry data in a quadrature phase, such that the equalizer is not configured to generate filtered or equalized signals from quadrature hard decision samples.

5. The equalizer of claim 2, further comprising a second filter that receives the in-phase samples, the second filter configured to generate a second filtered signal of the in-phase hard decision samples according to a second set of filter parameters.

6. The equalizer of claim 5, further comprising a second adaptation engine that receives an in-phase error signal, the second adaptation engine configured to update the second set of filter parameters based at least in part on the in-phase error signal.

7. The equalizer of claim 6, wherein the summing device is further configured to subtract the second filtered signal from the data signal.

8. The equalizer of claim 2, further comprising a gain device coupled between the data signal and the summing device.

9. The equalizer of claim 2, wherein the first adaptation engine comprises an integrated circuit.

10. The equalizer of claim 2, wherein the first adaptation engine comprises a processor.

11. The equalizer of claim 2, further comprising an analog-to-digital converter that receives the data signal.

12. An equalizer configured to compensate for the effects of a communication channel on received data, the equalizer comprising:

a first filter that receives in-phase hard decision samples corresponding to an equalized signal, the first filter configured to generate a first filtered signal of the in-phase hard decision samples according to a first set of filter parameters;

a first adaptation engine that receives a quadrature hard decision sample corresponding to the equalized signal, the first adaptation engine configured to update the first set of filter parameters based on the quadrature hard decision sample and the in-phase hard decision samples;

a summing device that receives a data signal and the first filtered signal, the summing device configured to subtract the first filtered signal from the data signal to generate the equalized signal; and a second filter coupled between the data signal and the summing device, the second filter configured to filter the data signal according to the first set of filter parameters.

13. The equalizer of claim 12, wherein the second filter is configured to receive an oversampling clock having a frequency that is a positive integer multiple of the Nyquist rate of the input signal.

14. A method for equalizing a communication channel, the method comprising:

generating hard decision data comprising a first in-phase sample and an in-phase sample history of soft decision data, the in-phase sample history comprising at least a second in-phase sample of the soft decision data;

generating a quadrature sample of the soft decision data, wherein the quadrature sample comprises a hard decision and is generated from a sampling time that is phase shifted from a sampling time used for the first in-phase sample;

generating a first filtered signal of the hard decision data based at least in part on the in-phase sample history and the quadrature sample; and subtracting the first filtered signal from a received data signal for generation of the soft decision data.

15. The method of claim 14, wherein generating the first filtered signal comprises, in response to detecting a transition between the first in-phase sample and the second in-phase sample, updating a plurality of filter coefficients.

16. The method of claim 15, wherein updating the plurality of filter coefficients comprises generating an updated filter coefficient vector $W_{k+1}$ given by $W_{k+1}=W_k+ \mu*EN*Q*I_{k-1}$, wherein $W_k$ represents a filter coefficient vector, $\mu$ represents a step-size scalar, EN represents a transition-detect enable signal, Q represents the quadrature sample, and $I_{k-1}$ is a vector representing the in-phase sample history.

17. The method of claim 14, wherein generating the hard decision data comprises sampling the soft decision data based on an in-phase clock corresponding to the received data signal.

18. The method of claim 17, wherein generating the quadrature sample comprises sampling the soft decision data based on a quadrature clock.

19. The method of claim 14, further comprising generating an in-phase error signal corresponding to the difference between the soft decision data and the hard decision data.

20. The method of claim 19, further comprising:

generating a second filtered signal of the hard decision data based on the in-phase error signal; and subtracting the second filtered signal from the received data signal.

21. The method of claim 14, further comprising filtering the received data signal before subtracting the first filtered signal from the received data signal.

22. The method of claim 21, wherein the filtering of the received data signal is based on the in-phase sample history and the quadrature sample.

23. The method of claim 21, wherein the filtering of the received data signal comprises filtering at a positive integer multiple of the Nyquist rate of the received data signal.

24. The method of claim 14, further comprising adding non-linear gain to the received data signal before subtracting the first filtered signal from the received data signal.

25. An equalizer that embodies the method of claim 14.

26. The method of claim 14, wherein the quadrature sample is defined by zero-crossing.

27. The method of claim 14, wherein the received data signal is encoded in a non-return to zero (NRZ) format such that the received data signal does not carry data in the quadrature phase.

* * * * *